Patented July 5, 1927.

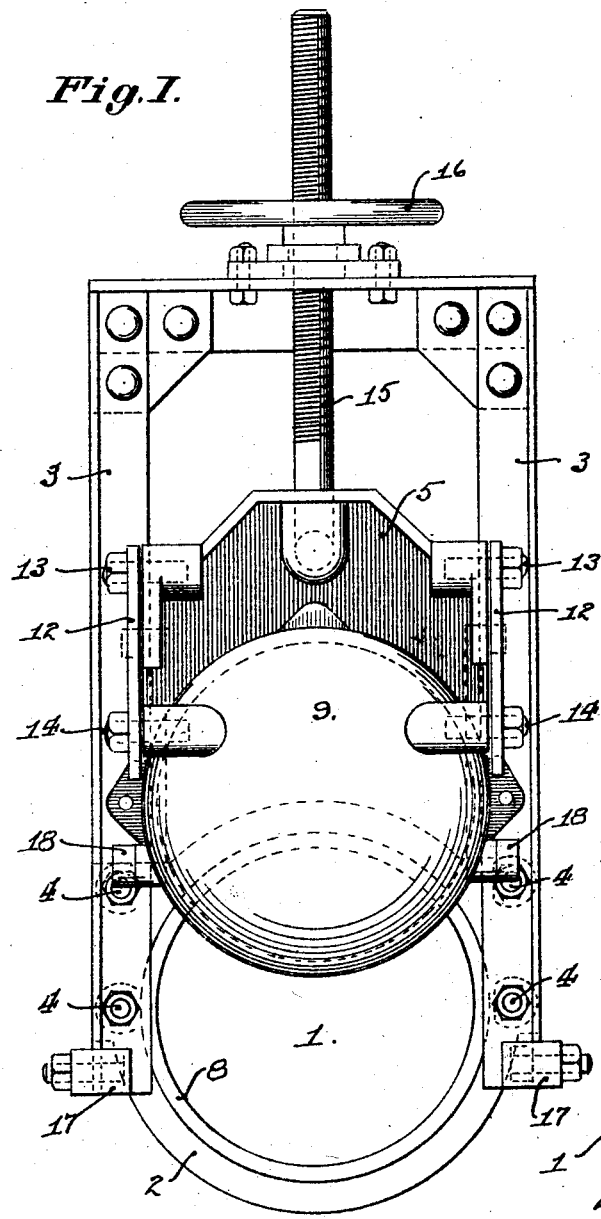
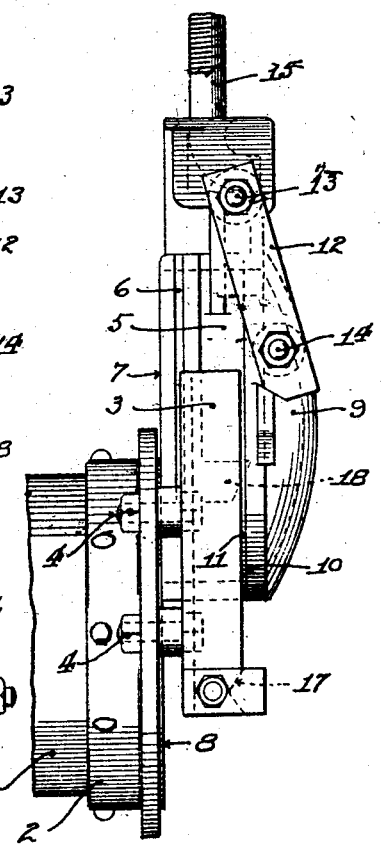

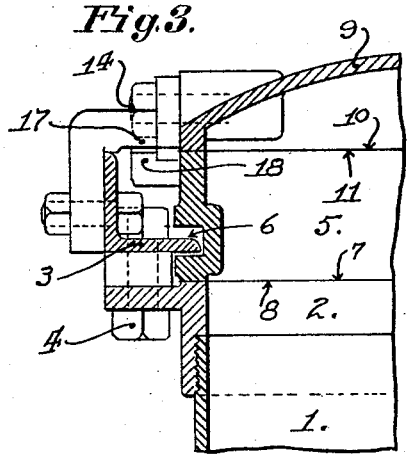
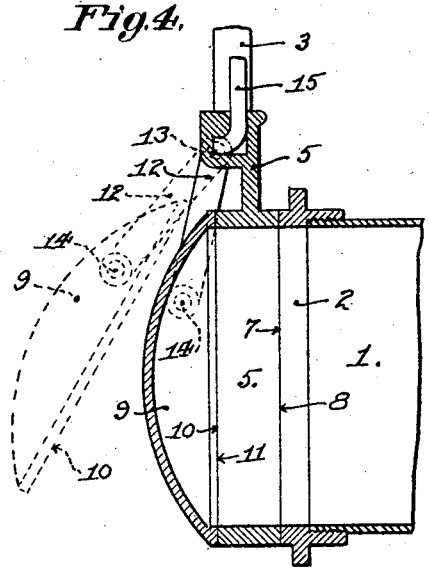
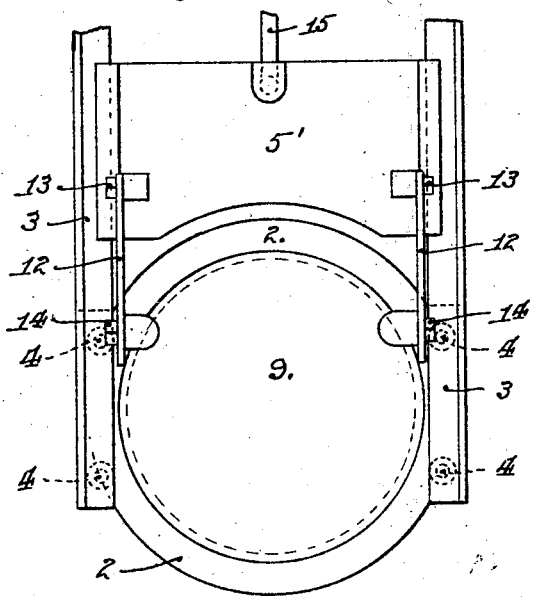
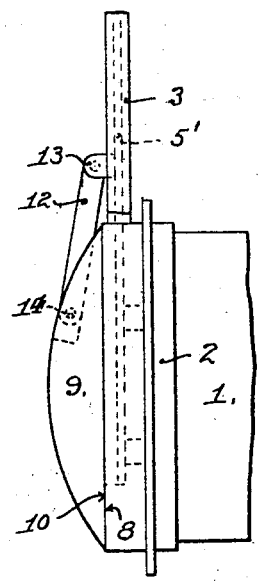

1,634,697

UNITED STATES PATENT OFFICE.

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

CONVERTIBLE AUTOMATIC FLOODGATE AND CONTROLLABLE HEADGATE.

Application filed August 11, 1924. Serial No. 731,342.

My invention relates to the class of gates for controlling the flow of water in conduits, for example, as are used in irrigation and drainage works.

The object of my invention is to provide a single structure which will function both as an automatic flood gate and as a controllable head gate. In irrigation and drainage work it is frequently convenient to provide means for utilizing the drainage conduit for irrigating by reversing the direction of flow of the water through said conduit. It then becomes necessary to provide an automatic flood gate at or near the mouth of the conduit to prevent the inflow of water thereinto when drainage and not irrigation is desired, and it is also necessary to provide controllable means for permitting such inflow when irrigation instead of drainage is to be practiced.

Under these conditions the ordinary types of swinging automatic flood gates are not suitable for use as head gates to admit a controlled quantity of water, partly because such gates must be opened against the flow or head of water outside the conduit, and if this head is at all high the opening of the gate is almost impossible; and partly because with such gates the amount of water entering the conduit cannot be accurately controlled.

By means of the device embodying my present invention, however, I am enabled to provide a single gate structure of simple construction which functions perfectly both as an automatic flood gate and as a controllable head gate.

It is to be understood that the form and construction of the device may be varied from that herein shown and described, within the scope of the claims hereto appended, without departing from the spirit of the invention as set forth in said claims.

My invention will now be fully described with reference to the accompanying drawings, wherein—

Fig. 1 is a front elevation of my convertible gate, showing it in open position when used as a head gate.

Fig. 2 is a partly broken side elevation of the same.

Fig. 3 is a horizontal sectional detail taken on the center line of the conduit, showing the gate in closed position.

Fig. 4 is a vertical sectional detail, illustrating the action of the gate when used as an automatic flood gate.

Fig. 5 is a front elevation of a modified form of my gate.

Fig. 6 is a partly broken side elevation of the same.

In the drawings and referring for the present to Figs. 1, 2, 3 and 4 thereof, the reference numeral 1 designates a conduit, to the end of which is permanently secured a fixed flanged seat member or ring 2. A pair of substantially vertically disposed frame members 3 are secured to the flange of the seat member 2 at opposite sides thereof, as shown at 4, and extend upwardly therefrom. Said frame members are preferably made of angle iron, as shown, and serve as guides for a slidable carrier member 5 whose side edges are provided with grooves 6, Fig. 3, adapted to slide upon the frame members 3. The lower portion of the carrier member 5 is annularly formed, and is provided with a rear face 7 adapted to make close contact with a front face 8 formed upon the fixed seat member 2 when the carrier member 5 is in its lowermost position as shown in Figs. 3 and 4.

A gate or cover member 9 is mounted by means of a hinge connection upon the carrier member 5, and is provided with a rear face 10 adapted to coact with a front face 11 formed upon the lower annular portion of said carrier member 5. The connection between the gate or cover 9 and the carrier member 5 may be of any suitable form adapting said cover member to swing outwardly away from said carrier member under the action of water flowing through the conduit 1. I prefer, however, to employ a connection comprising a pair of links 12, Figs. 1 and 2, pivotally connected at their upper ends with the carrier member, as shown at 13, and at their lower ends with the cover or gate member 9 at a point slightly above its center as shown at 14. This form of hinge connection permits the cover member 9 to normally lie against the front face of the carrier member 5, as shown in full lines in Fig. 4. It also provides the greatest possible area of opening between said cover member 9 and said carrier member 5, as shown in dotted lines in Fig. 4, under the action of the water issuing from the conduit 1.

The carrier member 5 is raised and lowered in its guides 3 by any suitable means, as for example, a threaded rod 15 and a hand wheel 16 as shown in Fig. 1. The frame or guides 3 and the carrier member 5 are provided with coacting wedge blocks 17 and 18 respectively, Figs. 1, 2 and 3, which cause the carrier member to be tightly wedged in its lowermost position against the face 8 of the fixed seat ring 2 to make a tight joint therebetween.

The operation of my gate will be readily apparent from the foregoing description. When it is to be used as an automatic flood gate the carrier member 5 is in its lowermost position as shown in Figs. 3 and 4. In this position, as long as the water level outside the conduit is higher than that inside, the gate member 9 will remain closed as shown in full lines in Fig. 4, thus preventing the water from backing up into the conduit. When the water level outside drops below the level of the water inside the conduit, the cover or gate member 9 will swing outwardly, as indicated by the dotted lines in Fig. 4, thus allowing the water to flow out of the conduit.

When, however, it is desired to use the device as a controllable head gate to admit water to the conduit, the carrier member 5 is raised, by means of the hand wheel 16, to a point necessary to admit the desired amount of water. In this use of the device, the direction of flow being from the outside into the conduit, the cover member 9 remains against its seat on the carrier member 5, and said cover and carrier members function as a simple gate, the amount of water admitted being capable of accurate control by the hand wheel 16.

As a modification of my device I may eliminate the lower or annular portion of the carrier member 5 described above. In this modified form of the structure, as illustrated in Figs. 5 and 6, the frame or guide 3 is secured, as before, to the ring or seat member 2 which in turn is secured to the end of the conduit 1. The slidable carrier member, however, designated by 5', is positioned wholly above the gate or cover member 9, with which it is connected as in the previously described form by means of the links 12 and the pivotal connections 13 and 14. The normal or closed position of the cover member 9, in this case, causes its rear face 10 to lie against the front face 8 of the ring member 2.

The operation of the modified form of my device is exactly similar to that of the previously described form. The carrier member 5' may be raised or lowered by any suitable means, a portion of the rod 15 being indicated for this purpose. The automatic action of the gate or cover member 9, to enable it to function as an automatic flood gate, is provided for by the links 12 in a manner similar to that described above.

I claim:

1. A structure for the described purpose comprising a flanged member adapted to be attached to the end of a conduit, said flanged member having a seat formed at the inner portion thereof; a pair of spaced parallel guide members secured to the said flanged member at opposite sides thereof and rising therefrom; a carrier member extending between and slidably mounted in said guides for movement in a plane substantially parallel with said seat; means associated with said carrier member for moving it in said guides; and a gate member pivotally connected with said carrier member and capable both of movement with said carrier member in a plane substantially parallel to said seat, and of free swinging movement, independent of said sliding movement, to and away from its closed position upon said seat.

2. A structure for the described purpose comprising a flanged member adapted to be attached to the end of a conduit, said flanged member having a seat formed at the inner portion thereof; a pair of spaced parallel guide members secured to the said flanged member at opposite sides thereof and rising therefrom; a carrier member extending between and slidably mounted in said guides for movement in a plane substantially parallel with said seat; means associated with said carrier member for moving it in said guides; a pair of spaced links having their upper ends pivotally connected with said carrier member; and a gate member pivotally connected with the lower ends of said links and capable both of free swinging movement toward and away from said seat and of movement with said carrier member in a plane substantially parallel to said seat.

3. A structure comprising a member adapted to be attached to the end of a conduit, said member having a seat formed at the inner portion thereof; a pair of spaced parallel guides secured to said member at opposite sides thereof and rising therefrom; a carrier extending between and slidably mounted in said guides for movement in a plane substantially parallel with said seat; means associated with said carrier for moving it in said guides; a pair of spaced links having their upper ends pivotally connected with said carrier; and a gate pivotally connected with the lower ends of said links and capable of free swinging movement toward and away from said seat and of movement with said carrier in a plane substantially parallel to said seat.

4. A flood gate comprising a pipe, a ring seat secured to the end thereof, a frame extending above the pipe, a screw extending down from the top of the frame and engaging a cross-head guided by the frame for upward movement thereof, a valve disk overlying the end of the pipe and positioned against the seat, and pivotal connections from the cross-head to the disk whereby the disk may be raised with the cross-head and swung outwardly from the pipe.

In testimony whereof I have signed my name to this specification.

KARL JOHAN THORSBY.